May 15, 1962 S. GREENWALD 3,034,496
FOOD WARMING AND COOKING APPARATUS
Filed Oct. 3, 1960
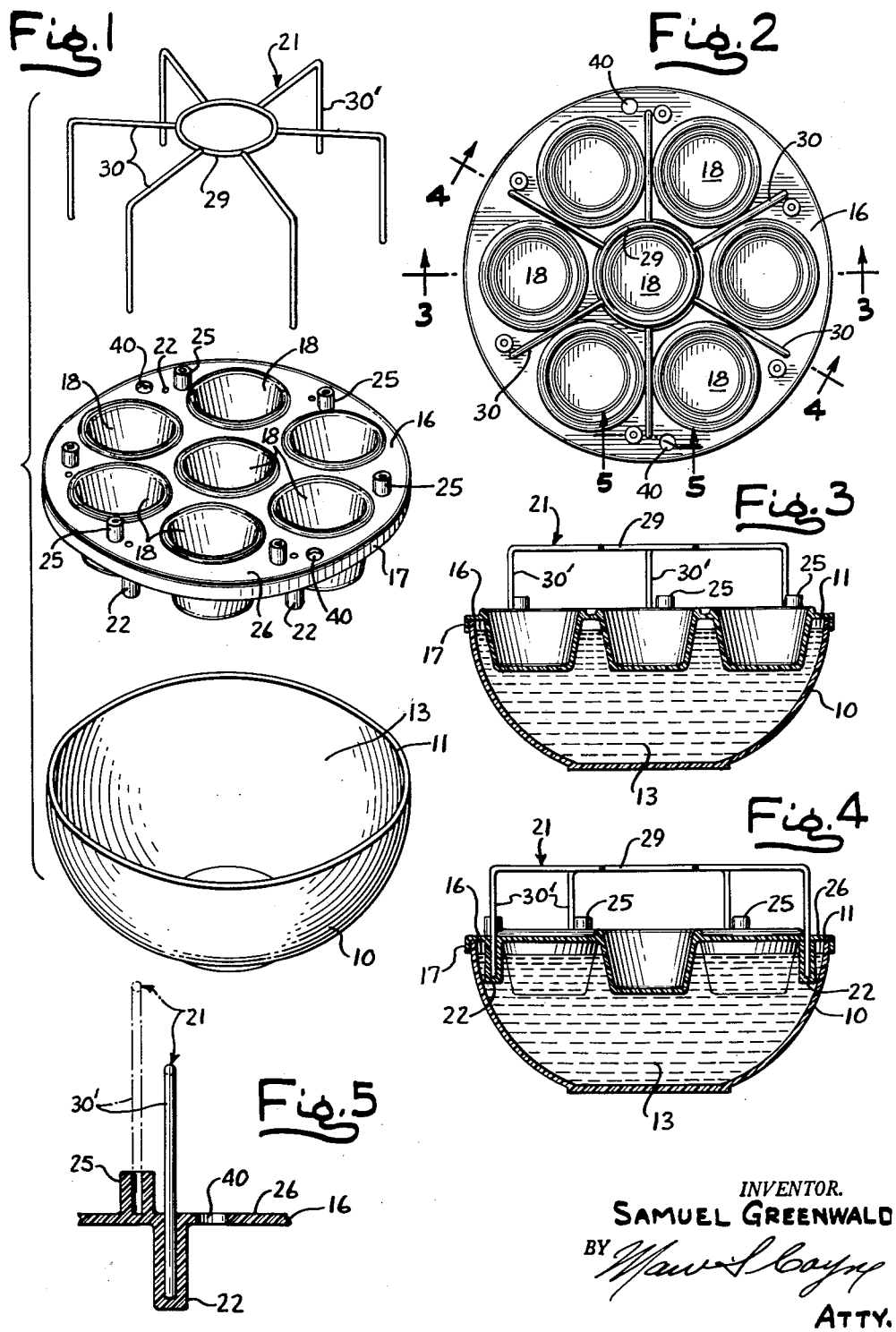
INVENTOR.
SAMUEL GREENWALD
BY
ATTY.

United States Patent Office 3,034,496
Patented May 15, 1962

3,034,496
FOOD WARMING AND COOKING APPARATUS
Samuel Greenwald, Chicago, Ill., assignor to Candle Heat Appliance Corporation, Chicago, Ill., a corporation of Illinois
Filed Oct. 3, 1960, Ser. No. 60,116
12 Claims. (Cl. 126—261)

The present invention relates generally to a portable article warming or cooking device and, more particularly, to a device of this type which employs combustible heating means such as candles.

Portable warming devices employing candles generally comprise some sort of a casing above the candles to support the articles to be warmed.

Devices of this type constructed in accordance with the teachings of the prior art have significant drawbacks, the elimination of which is a primary object of this invention.

One disadvantage of having a casing type of supporting means is that oftentimes the lack of oxygen to the burning flames of the candles causes an excess of lamp black and smoke.

Another disadvantage is due to the fact that the height of the supporting member is unadjustable with respect to the candle flames which decrease in height as they are being burned.

Still further as to the disadvantages of a casing type of support, the insertion and removal of candles from their respective receptacles cannot be accomplished without positioning the casing support to accomplish this purpose.

Still another disadvantage is from the intense heat that has been reflected back at the members holding the candles in a warming device employing a plurality of candles. This heat has made it necessary to have the members supporting the candles be made of material which can withstand the heat, this type of material being expensive.

The prior art reveals that certain attempts have been made to obviate these disadvantages. However, some of the problems that were inherent with such devices are still present.

The article warming device of this invention has a construction which more effectively eliminates the disadvantages of prior art devices by providing a wire frame for supporting articles to be warmed above the candles instead of the conventional type of casing support member. This construction provides, among other things, a great deal more oxygen to the candles and also prevents the absorption of an excess amount of heat by the candles. Also, the candles may be readily inserted and removed from their respective cubicles.

It is, therefore, a primary object of the present invention to provide a new and improved portable warming or cooking device which employs a plurality of combustible heating means such as candles whereby the amount of heat generated therefrom may be varied by selectively burning the candles.

Another object of this invention is to provide a portable cooking or warming device which has a wire frame associated therewith to support the article to be warmed thereby and to have the distance between the warming member and the article to be warmed thereby adjustable relative thereto.

It is also an object of this invention to provide a support means for a portable cooking device which will enable a greater amount of oxygen to be available to the candle flame, thereby preventing an excess amount of lamp black and smoke.

Another object of this invention is to provide a support for an article to be warmed by a plurality of candles in a warming device which enables the ready insertion and removal of candles with respect to their receptacles.

Other objects and advantages are inherent in the structure disclosed and claimed or will become apparent to those skilled in the art from the following detailed description in connection with the accompanying drawings wherein:

FIGURE 1 is a disassembled pictorial view of the component parts of the heating device.

FIGURE 2 is a top view of the heating device when the structure supporting the article to be warmed is in its lowest position.

FIGURE 3 is a sectional view of the heating device shown in FIGURE 2, taken along the section plane 3—3.

FIGURE 4 is a sectional view of the heating device shown in FIGURE 2, taken along the plane 4—4.

FIGURE 5 is a sectional view of a fragmentary portion of the heating device shown in FIGURE 2 taken along the plane 5—5.

Referring generally to the drawing, this invention is illustrated as a substantially cylindrical-shaped heating device formed of suitable moldable plastic material which has a plurality of cup-shaped members therein to support the candles that furnish the heat. The cup-shaped members are shown as part of a round planar member which is in turn supported by a structure which can contain a liquid therein for cooling. A wire frame is adjustably and removably associated with the planar member to support the article to be heated whereby the distance between the candles and the article to be warmed may be varied.

This invention, however, is not intended to be limited to a specific type of heating device which employs a wire frame or moldable plastic material for holding the candles, but rather the invention may be applied to any well-known type of heating device of any shape employing any kind of open non-inflammable frame for supporting the article to be warmed, also any well-known structure for holding the combustible heating means may be employed.

More specifically, the heating device shown in FIG. 1, which is the preferred embodiment of this invention, comprises a support member 10 having a circular-shaped top opening 11 and having a chamber 13 therein for containing any well-known cooling liquid such as, for instance, water. A circular planar member 16 having a circular wall portion 17 connects with and covers the circularly shaped top 11 of support 10, this being clearly shown in FIGURES 3 and 4. The circular planar member 16 has cup-shaped members 18 formed therein for supporting combustible members such as candles. Apertures 40 are provided in the circular planar member through which cooling liquid may be supplied to the chamber 13 and steam may escape therefrom.

A wire frame 21, which has a central ring member 29 and arms 30 projecting therefrom and terminating in depending leg portions 30', is adjustably and removably associated with the circular planar member 16. As shown in FIGS. 2, 4 and 5, the circular planar member 16 has a plurality of depending chambers or socket elements 22 thereon that receive the lower ends of the leg portions 30' of the wire frame 21. Also provided on the upper surface 26 of the circular planar member 16 are a plurality of raised chambers or socket elements 25 proximately disposed with relation to the depending chambers 22.

The lower ends of the downwardly extending leg portions 30' may either be associated with and disposed in the raised chambers 25 or in the depending chambers 22. From the drawings, it can be seen that when the wire frame 21 is supported in the chambers 25, the body 29 which supports articles to be warmed by the heating means is at its farthest distance from the heating means and when the wire frame 21 has its wires 30' disposed in the depending chambers 22 the body 29 is at its closest distance to the heating means. This variance in distance between the heating means and body 29 may be readily accomplished by merely removing the same from the chambers 22 and arranging the same in the chambers 25.

The wire frame 21 has the arms 30 extending radially from the ring member 29 and forming a horizontal plane surface therewith for supporting articles to be heated. The arms 30 are bent at right angles at an equal distance from the center and extend downwardly to form the leg portions 30' for arrangement in either one of two positions within the planar member 16 as described above.

In providing an open wire frame support in a cooking or warming device, the amount of oxygen available to the candle flames is greatly increased in comparison to the prior types of supports. The elimination of side and top walls in the supports of the casing type prevents the candles from absorbing heat therefrom, thereby prolonging the life of the candles and the efficiency of the unit. It would also be obvious that by adjusting the height of the support as the candles are being consumed, a more uniform heat will be obtained; thereby increasing the effectiveness of the device. Because of the decrease in the amount of heat reflected when the unit is in use, it is possible to utilize a comparatively inexpensive moldable plastic type of material for supporting the candles. Thus, a new and improved warming and cooking device which employs combustible heating means, such as candles, has been herein described.

It is to be understood that the specific embodiment described above and shown in the drawing is merely one of the many forms which the present invention may take in practice without departing from the scope of the invention as defined in the appended claims which are to be interpreted as broadly as possible.

I claim:

1. In a device of the class described, in combination, a bowl-like casing capable of retaining a cooling liquid, a cover plate for said casing comprising a generally planar element adapted to rest on a peripheral edge of said casing, a wire utensil support frame having depending legs, said cover plate having a plurality of receptacles depending therefrom for holding candles, and said cover plate having two sets of socket elements, each set being of a predetermined depth for receiving respective depending legs of said frame to maintain said frame at predetermined respective levels above said cover plate.

2. In a device as set forth in claim 1, said cover plate, said receptacles, and said sets of socket elements being integrally molded of plastic.

3. In a device as set forth in claim 2, one of said sets of socket elements extending above said cover plate and the other of said sets extending below said cover plate.

4. In a device as set forth in claim 3, said casing, said cover plate, and said wire frame being generally circular in plan outline, said wire frame having radially disposed support arms terminating inwardly in a ring, said depending legs being formed integrally of respective support arms, wherein said frame is of simple spider-like appearance and construction.

5. In a device of the class described, in combination, a casing having a top peripheral edge, a cover plate for said casing, cooling means disposed in said casing, a wire support frame for supporting utensil, said support frame having generally vertical legs, said cover plate having means for supportably receiving said legs, said cover plate having a plurality of receptacles depending therefrom for holding candles, said receptacles being arranged in a cluster about a central axis to concentrate heat, said wire frame being of spider-like construction, said legs being angularly spaced to straddle respectively the portions of said cover plate between said receptacles whereby flames from candles supported in respective receptacles have substantially unimpeded paths to utensils supported on said frame.

6. In a device of the class described, in combination, a bowl-like casing capable of retaining a cooling liquid and having a top peripheral edge, a cover plate for said casing adapted to be removably supported on said edge above the surface of cooling liquid retained in said casing, a wire support frame for supporting utensils, said support frame having generally vertical legs, said cover plate having socket elements for receiving said legs, said cover plate having a plurality of receptacles depending therefrom for holding candles, said receptacles extending downwardly to a sufficient extent to be substantially immersed in a cooling liquid, said cover plate, said receptacles, and said socket elements being integrally molded of plastic, said receptacles being arranged in a cluster about a central axis, said wire frame being of spider-like construction, said legs being angularly spaced to straddle respectively the portions of said cover plate between said receptacles whereby flames from candles supported in respective receptacles have substantially unimpeded paths to utensils supported on said frame.

7. In a device as set forth in claim 6, said cover plate having substantially its entire area covered with said candle bearing receptacles to produce a greater choice for selecting the desired amount of heat and the direction of said heat towards the object being heated.

8. In a device of the class described, in combination, a bowl-like casing for holding a cooling liquid, a cover plate for said casing comprising a generally planar element, a wire utensil support frame having depending legs, said cover plate having a plurality of receptacles depending therefrom to hold respective candles, and said cover plate having two sets of socket elements, each set being of a predetermined depth for receiving respective depending legs of said frame to maintain said frame at predetermined respective levels above said cover plate, said receptacles being disposed in a cluster to concentrate the heat of the candles therein.

9. In a device of the class described, in combination, a bowl-like casing for holding a cooling liquid, a cover plate for said casing comprising a generally planar element, a wire utensil support frame having depending legs, said cover plate having a plurality of receptacles depending therefrom, each one adapted to hold a single candle, and said cover plate having two sets of socket elements, each set being of a predetermined depth for receiving respective depending legs of said frame to maintain said frame at predetermined respective levels above said cover plate, said cover plate, said receptacles, and said sets of socket elements being fashioned integrally.

10. In a device as set forth in claim 9, said receptacles being disposed in a cluster to concentrate the heat of the candles therein.

11. In a device of the class described, in combination, a casing having a top peripheral edge, a cover plate for said casing, cooling means disposed in said casing, and a wire support frame having generally vertical legs, said cover plate having means for supportably receiving said legs, said cover plate having a plurality of receptacles depending therefrom for holding candles, said receptacles being arranged in a cluster about a central axis to concentrate the heat, said frame being of spider-like construction.

12. In a device of the class described, in combination, a casing having a top peripheral edge, a cover plate for said casing, cooling means disposed in said casting, and a wire utensil support frame having generally vertical legs, operably associated with said casing and adapted when in operable condition to be spaced a predetermined distance above said cover plate, said cover plate having a plurality of receptacles depending therefrom for holding candles, said receptacles being arranged in a cluster about a central axis to concentrate the heat, said frame being of a spider-like structure.

References Cited in the file of this patent

UNITED STATES PATENTS

| 471,742 | Busch | Mar. 29, 1892 |
| 1,431,549 | Tommasi | Oct. 10, 1922 |
| 1,701,989 | Turner | Feb. 12, 1929 |
| 2,371,410 | Rickenbacher | Mar. 13, 1945 |
| 2,678,644 | Banks et al. | May 18, 1954 |
| 2,680,963 | Churchill | June 15, 1954 |
| 2,814,286 | Arnold | Nov. 26, 1957 |
| 2,874,631 | Cooksley | Feb. 24, 1959 |

FOREIGN PATENTS

| 597,763 | Great Britain | Feb. 3, 1948 |